United States Patent [19]

López

[11] 3,903,240

[45] Sept. 2, 1975

[54] PROCESS FOR PRODUCING BASIC SULFATES AND ALUMINUM HYDRATES

[76] Inventor: Wenceslao X. López, Mineral de Sirena No. 5, Lomas de Marfil, Guanajuato, Mexico

[22] Filed: Oct. 25, 1972

[21] Appl. No.: 300,717

[30] Foreign Application Priority Data
Sept. 17, 1969 Mexico............................ 113975

Related U.S. Application Data

[63] Continuation-in-part of Ser. No. 72,502, Sept. 15, 1970, abandoned.

[52] U.S. Cl. ................ 423/127; 423/122; 423/123; 423/128; 423/194; 423/198; 423/199; 423/208
[51] Int. Cl.² ........................ C01F 7/02; C01D 5/00
[58] Field of Search .......... 423/124, 656, 629, 305, 423/351, 545, 551, 122, 128, 127, 194, 148, 423/199, 208

[56] References Cited
UNITED STATES PATENTS

| | | | |
|---|---|---|---|
| 1,249,125 | 12/1917 | Langford | 423/556 |
| 1,256,605 | 2/1918 | Spence et al. | 423/128 X |
| 1,538,837 | 5/1925 | Moxham | 423/556 |
| 1,648,262 | 11/1927 | Frost | 423/124 |
| 1,850,038 | 3/1932 | Tanaka | 423/124 |

FOREIGN PATENTS OR APPLICATIONS

| | | | |
|---|---|---|---|
| 331,552 | 7/1930 | United Kingdom | 423/128 |
| 429,717 | 6/1926 | Germany | 423/556 |

*Primary Examiner*—Herbert T. Carter
*Attorney, Agent, or Firm*—Waters, Schwartz & Nissen

[57] ABSTRACT

Basic aluminum sulfates and hydrated aluminum oxides (hydrated aluminas) are prepared by successive treatment of minerals such as alunite, aluminite, variscite and wavelite with gaseous ammonia, gaseous sulfur dioxide and sulfuric acid to form salt solutions which are heated to temperatures no higher than their boiling points to give the desired products.

11 Claims, No Drawings

PROCESS FOR PRODUCING BASIC SULFATES AND ALUMINUM HYDRATES

CROSS REFERENCE TO RELATED APPLICATIONS

This application is a continuation-in-part of my copending application Ser. No. 72,502, filed Sept. 15, 1970, for "Process for Producing Basic Sulfates and Aluminum Hydrates", now abandoned.

GENERAL DISCLOSURE OF THE INVENTION

This invention refers to a process for the production of basic sulfates and aluminum hydrates by a successive treatment of minerals such as alunite, aluminite, variscite and wavelite with ammonia, or basic substance, gaseous sulfur dioxide and sulfuric acid.

The process of this invention consists of the following steps: calcination of the previously broken and classified mineral at its dehydroxylation temperature for the amount of time necessary to provoke loss of all the bound water. Once this has been achieved, the mineral is ground to a size such that the particles may be easily suspended in water.

Addition of water to the calcined material in order to form an aqueous suspension. The suspension is then heated to boiling temperature and, at this point, gaseous ammonia is bubbled through the whole suspension as uniformly as possible. This bubbling of ammonia, through the aqueous suspension, gives rise to a reaction that produces ammonium sulfate and/or phosphate which dissolve in the solution. In case potassium sulfate also forms part of the ore being treated, it dissolves in said solution as well. Anyway, one or more bubbling operations with ammonia may be required, with the purpose of attaining that all the sulfates and/or phosphates of the ore dissolve in the solution. In each step, it is important that the ammonia is held in its gaseous state in which it is water insoluble. The gaseous ammonia used must correspond to the stoichiometric quantity theoretically required for the reaction, but an excess may be required depending upon whatever may be convenient from the economic and operational point of view.

Once the treatment of the suspension with gaseous ammonia is completed, the solution is filtered leaving a cake of solid material which is washed. This cake contains all the aluminum originally present in the ore, generally in the form of alumina or aluminum hydroxide.

The filtered liquor is either evaporated until achieving the complete crystallization of the sulfates and/or phosphates for industrial use, or else the liquor can serve as a base for the preparation of fertilizers, adjusting its composition to the final formulation that may be desired.

Water is added to the aforementioned cake and it is shaken in order to form a uniform suspension. This suspension is heated to a temperature below boiling point and then sulfur dioxide is bubbled through it, allowing free bubbling of the gas which has not reacted or has not been dissolved in the water. The gaseous sulfur dioxide is recirculated until all of it combines with the hydrated alumina or the aluminum hydroxide in the presence of water in order to form soluble acid aluminum sulfite with a varying concentration of aluminum. The thus treated suspension is filtered or decanted obtaining a clear solution which contains most of the aluminum in the form of soluble acid sulfite. However, here again it will be important to notice that one or more bubbling operations with gaseous sulfur dioxide may be needed, the important thing is that first, as much aluminum as possible is dissolved (in this case as soluble acid aluminum sulfite as already indicated) and second, that the sulfur dioxide being bubbled remains in its gaseous state.

The so obtained solution of acid aluminum sulfite may be employed later without any modification as it will be shown afterwards, or else it may be heated to boiling so that the sulfite decomposes with the evolution of sulfur dioxide which can be employed again in the process, and a mixture of basic aluminum sulfites and hydroxides or hydrated aluminas are precipitated. This precipitate is then filtered or decantered and it is washed in order to be employed in the final phase of the process.

The solid material which remains from the separation by filtration or decantation of the sulfite solution, contains the remnant portion of aluminum of that originally present in the mineral (part of which is found in the form of sulfite). This solid material is treated with the necessary quantities of sulfuric acid and water in order to convert all the aluminum present into soluble aluminum sulfate and obtain a solution of the same whose aluminum concentration is variable. The operation is performed at boiling temperature, with which all the sulfurous anhydride corresponding to the sulfites is removed. This sulfurous anhydride may again be used in the process. The final mixture is then filtered or decanted and the solids are washed, by which a solution of aluminum sulfate is obtained.

Finally, the aluminum sulfate solution is heated to boiling temperature, adding to it either the above mentioned basic sulfites and aluminum hydrates obtained in the heating operation of the earlier prepared sulfite solution, or the sulfite solution as such if it has not been decomposed by said heating operation mentioned. This mixture is vigorously shaken by which the basic sulfite or the acid aluminum sulfite decomposes with the evolution of sulfurous anhydride which is once more employed in the process, and with the simultaneous formation of basic sulfate that precipitates in the form of non soluble white powder. This powder is filtered and washed, in order to obtain the basic water insoluble aluminum sulfates mixed with hydroxides or hydrated aluminas practically exempt of impurities. The washing step, if desired, may be carried out in an inert atmosphere of carbon dioxide or nitrogen and the wash water may contain a soluble reducing agent, such as preferably ammonium sulfite. In fact, the acid soluble impurities that accompany the ore, such as iron and others, remaining in the solution.

BACKGROUND OF THE INVENTION

It is necessary to point out the fact that all the known processes of the prior art referring to the production of potassium sulfate and ammonium sulfate from alunites, such as those described in:

Publication: "La Alunita"
Rovirosa N. Y. Mexico (1966)
Published by the Fideicomiso de Minerales no Metalicos, which is an abridgement of the world patents and publications from 1910 to 1964, on the treatment of alunites.

Tanaka H.
U.S. Pat. No. 1,850,038 (1932)
Lixiviation of Alunites with Ammonia Solution and Sulfuric Acid.
Sun Ch.
J. Chem. Eng. (China) 2,117–27 (1935)
Recent Research on the Employment of Alunite in the Production of Alumina.
Labutin G. V. & Cultivoin S. G.
Lagkie Metal 5, No. 10,41 — (1936)
Recovery of Alumina and Fertilizers from Chinese Alunite.
Hohrst G. & Wang H.
J. Chem. Eng. (China) 4, 234–47 (1937)
The Separation of Potassium Sulfate and Ammonium Sulfate from Alunite.
Liu F.
J. Chem. Eng. (China) 4, 37–40 (1937)
Alunite as a raw material to obtain Potassium Sulfate, Ammonium Sulfate and Aluminum.
Chang K., Liu F. & Chow R.
J. Chem. Eng. (China) 15, 86–96 (1948)
Modification of the Kalunite process for the production of Alumina.
Fleischer, A.
With the permission of the Department of Commerce of the United States of America of Kalunite, Inc. East Alton, Ill.

All these procedures coincide in the employment of aqueous ammonia solutions, i.e. of ammonium hydroxide to treat the calcined alunite ore in concentrations that range from 5 to 50% of ammonium hydroxide and they use amounts of solution whose total ammonia content represents an excess equivalent to 250% or more of that theoretically required. Additionally, the operating temperatures vary from room to 100°C in closed container.

It is also necessary to point out that in these already known processes, it is required that the ammonium hydroxide of the solution diffuses into the particle of the ore, in order to react with the alunite enclosed in it forming ammonium sulfate while at the same time potassium sulfate is solubilized. The disadvantage of the diffusion of these sulfates to the exterior of the particle to enter into solution, is that it impairs the diffusion of the ammonium hydroxide mentioned, mainly because of the common ion effect. All this signifies a slower reaction, and the production of dilute ammonium sulfate and potassium sulfate solutions with a high content of ammonium hydroxide. Furthermore, great excesses of ammonium hydroxide with respect to the theoretical amount required by the mineral are necessary. Under these conditions, these processes are made practically inapplicable (unfavorable) to low grade ores.

In the process corresponding to the modification of the kalunite process, the alunite ore is not directly treated, but rather a basic aluminum and potassium sulfate obtained by hydrolysis of normal potassium alum, the treatment being in the same form as that described, i.e. treating the solid with a solution of ammonium hydroxide.

In contrast to the prior art, in the process of the present invention one operates in such a way as to obtain the maximum contact between the gaseous ammonia that does not form ammonium hydroxide and water-saturated particle, diffusing the ammonia into the ore particle which together with the water and the alunite enclosed in the ore react to form ammonium sulfate and making soluble the potassium sulfate, not existing therefore the common ion effect which slows down the reaction. The excess of ammonia over the theoretical amount required, which may be as low as a 10%, does not remain in solution since the suspension is maintained at boiling temperature allowing it to be removed and recirculated again because some ores require several treatments with gaseous ammonia in order to dissolve all the ore's sulfates and phosphates. This gaseous ammonia also contributes to the maintainance of the particles in suspension.

Under these conditions, the reaction is complete and very rapid since it only requires 2 or 3 minutes. The solution obtained contains a high concentration of sulfates and/or phosphates and besides, the ammonia content of this solution is practically nil due to the temperature of operation.

All the above mentioned makes this process applicable to alunites, aluminites, variscites and wavelites, with excellent yields.

As for the basic aluminum sulfate, no previous knowledge exists of any publication where a process for producing basic water insoluble aluminum sulfate, from alunites, aluminites, wavelites and variscites is mentioned. The processes in which the production of such compounds from other minerals are mentioned, are the following:

A New Acid Process for Recovering Alumina of High Purity, From Bauxites and Low Grade Minerals, Developed by C.S.I. R.O.S. Division of Mineral Chemistry. T. R. Scott. Melbourne, Australia.

In this process a basic aluminum sulfate insoluble in acid medium is obtained with a composition of $3Al_2O_3$ and 4 moles of $SO_3$ as an intermediate step for the production of high purity alumina. And the process is carried out by hydrolysis of aluminum sulfate solutions obtained from the ore, autoclaving at temperatures of about 220°C and high pressures with a yield of 60% and a reaction time from 15 to 30 minutes.

In the article:
Treatment of alunite with ammonia liquors and sulfurous acid.
Chow J. — J. Chem. Eng.
(China) 4, 41–3 (1937)

The calcined alunite is made soluble with ammonium hydroxide solutions. The alumina which remains in the residue is not useful in the production of aluminum due to the impurities that it contains, namely, silica and iron. To make it useful the alumina is treated with gaseous sulfurous dioxide for 5 hours in order to make the aluminum hydroxide soluble. By filtration, a clear solution almost free of silica and iron compounds is separated; this solution upon boiling precipitates alumina with few impurities.

The described processes differ from that of this invention as in the latter one, part of the aluminum hydrate or hydroxide is converted into soluble sulfite by using sulfur dioxide and the rest of it is easily and wholly extracted in the form of soluble aluminum sulfate by using sulfuric acid. Another novelty in this process is the treatment of the soluble sulfite solution or the precipitate of basic aluminum sulfates and hydrated aluminas with the aluminum sulfate solution at boiling temperature, causing the former to decompose violently with the evolution of sulfur dioxide which is again used in the process, this decomposition being caused, as much by the temperature as by the acid pH of the sulfate solution. This causes the aluminum to precipitate as basic sulfates and hydroxides or hydrated aluminas and preventing the precipitation of iron and other impurities, thanks to the acid pH already referred to and the reducing medium created by the presence of the sulfur dioxide. This form of operating assures a major recovery and a high purity of the products so obtained in relation to the processes pointed out which use sulfur dioxide or sulfuric acid exclusively.

This substance can be the final product or it may be converted by heating it into calcined alumina suitable for aluminum metallurgy.

Investigation of the Rule of Phases in the System $Al_2O_3 - SO_3 - H_2O$ (Basic region), Jack L. Henry & G. Brooks King, Journal of the American Chemical Society.

In this publication a study is made of basic aluminum sulfates obtained by reaction between aluminum sulfate and gel of aluminum hydroxide, indicating reaction times greater than 20 days.

Concerning the aluminites, variscites and wavelites and other aluminum ores, no process having any relation with this invention is known. In summary, taking as a basis that until the date of this invention there has been no knowledge of any publication, I consider that the process that I have described and the prior art mentioned are totally different.

DETAILED DISCLOSURE OF THE INVENTION

Example No. 1

500 g. of alunite previously broken to sieve −19 mm. were calcined in an electric muffle at constant temperature of 680°C for 60 minutes, obtaining with this the total dehydroxylation of the ore. The thus calcined ore was ground to sieve −28 tyler particle size and it was placed in a three neck flask provided with a stirrer, together with 1,500 cc of water. The suspension was stirred and heated to boiling while gaseous ammonia was bubbled through it by means of an arrangement having several outlets. The bubbling of the gaseous ammonia was maintained with free evolution thereof during 3 minutes, continuing with the stirring operation at the boiling temperature for 20 more minutes without further supplying ammonia. The thus treated suspension was filtered and washed and 94% of the potassium present in the ore was recovered.

The filtered cake was suspended in 1,500 cc of water in a three neck flask provided with a stirrer; sulfur dioxide was bubbled through this suspension during 90 minutes with free evolution thereof. The thus treated suspension was filtered and the resulting cake was passed to the three neck flask where a new suspension was formed with another 1,500 cc of water. Sulfuric acid was added to the suspension which was heated to boiling until an aluminum sulfate solution with pH of 2 was obtained allowing the free evolution of sulfur dioxide originating from the decomposition of sulfites; the suspension was filtered, leaving a filtered cake having a low aluminum and potassium content.

The solutions resulting from the treatment with $SO_2$ and sulfuric acid were mixed in a three neck flask and heated to boiling, maintaining a vigorous stirring until no more $SO_2$ was released. At this point, a suspension containing a white precipitate of basic aluminum sulfates and hydroxides or hydrated aluminas is produced.

The solids were filtered and washed and a 92% of the aluminum from the alunite was recovered, the iron and other impurities soluble in acid media, remained in the filtered solution.

Example No. 2

The same operations as described in Example No. 1 were performed, but with the following differences:

The filtered solution resulting from the treatment with $SO_2$ was carried out to boiling temperature to practically total precipitation of its aluminum content; the precipitate was filtered and washed and it turned to a reddish brown color because of the iron it retained. The filtrate is formed of a mixture of aluminum sulfites and aluminum hydroxides or hydrated aluminas.

The precipitate obtained was treated with the aluminum sulfate solution obtained as described in Example No. 1, carrying this suspension to boiling temperature the time necessary, in order to eliminate all the $SO_2$ of the basic sulfites, forming a white precipitate of basic aluminum sulfates and hydroxides or hydrated aluminas which is filtered and washed as indicated in Example No. 1, the impurities remaining in solution. About 90% of the aluminum contained in the alunite was recovered.

Example No. 3

The same operations as described in Example No. 1 were performed, but with the following differences:

40 cc of concentrated sulfuric acid were added to the filtrate obtained from the treatment with $SO_2$, and the solution was heated to boiling until total elimination of the $SO_2$ was achieved forming a white precipitate of basic sulfates and hydroxides or hydrated aluminas which was filtered and washed, the impurities remaining in the filtered liquid.

In this example, the solution of aluminum sulfate indicated in Examples Nos. 1 and 2 was not obtained separately, thus lowering the recovery of aluminum owing to the fact that the aluminum remaining in the residue was not made soluble.

The above descriptions of the examples have been given only for further clarity and understanding, and they should not be construed as representing limitations on the process of the invention, since the embodiments which are claimed as the inventor's property should be accepted with the widest scope possible.

I claim:

1. A process for preparing basic aluminum sulfates and hydrated aluminum oxides substantially free of impurities with collateral production of salts selected from the group consisting of ammonium and potassium sulfates and ammonium phosphate starting from an aluminum containing mineral which is selected from the group consisting of alunite, aluminite, variscite and wavelite, comprising dehydroxylating the mineral starting material by heating it, forming an aqueous suspension thereof, bubbling gaseous ammonia through the suspension while maintaining it at boiling temperature and forming ammonium and potassium sulfates and ammonium phosphate dissolved with water of the suspension and simultaneously forming hydrated aluminum oxides and aluminum hydroxide that remain in the suspension; separating the sulfates and phosphate solution from the hydrated aluminum oxides containing solids that are held in aqueous suspension, bubbling $SO_2$ through said suspension thereby forming acid aluminum sulfite that dissolves in the water of the suspension, separating the acid aluminum sulfite solution from the solids still present and forming an aqueous suspension with the solids remaining; treating this suspension with sulfuric acid and forming soluble aluminum sulfates with evolution of sulfurous anhydride that is recirculated to said aqueous suspension through which the $SO_2$ is being bubbled, separating the aluminum sulfates solution from the solids that still remain in suspension, mixing the previously separated acid aluminum sulfite solution with the aluminum sulfate solution, boiling the composite solution with further evolution of $SO_2$ that is also recirculated to said aqueous suspension through which the $SO_2$ is being bubbled, and producing a mixture of basic aluminum sulfates and hydrated aluminum oxides and hydroxide, filtering said mixture and separating the basic aluminum sulfates and hydrated aluminum oxides as the end products.

2. The process according to claim 1, in which the mineral is dehydroxylated by controlled calcination.

3. A process according to claim 1, in which the bubbling of gaseous ammonia through the suspension is prolonged until substantially all of the sulfates contained in the mineral have been reacted therewith.

4. The process according to claim 1 in which the amount of gaseous ammonia that is bubbled through the suspension, is in excess of the stoichiometrically required amount to form the ammonium and potassium sulfates and ammonium phosphate.

5. The process according to claim 1, in which the excess gaseous ammonia bubbled through the suspension is eliminated and collected, and recirculated again through the suspension.

6. The process according to claim 1, in which gaseous sulfur dioxide is bubbled through the suspension in order to form soluble acid aluminum sulfite at a temperature below boiling.

7. The process according to claim 1, in which the acid aluminum sulfite and the aluminum sulfate solutions are mixed and heated to boiling so as to precipitate substantially all of the aluminum in the form of basic aluminum sulfates and hydroxides.

8. The process according to claim 1, in which the sulfite solution is treated with sulfuric acid to convert part of the aluminum sulfites to sulfates and the solution is heated to boiling temperature until substantially all of the aluminum in the form of basic sulfates and hydroxides and hydrated aluminas is precipitated.

9. The process according to claim 1 in which the aluminum containing mineral is selected from alunite and aluminite and the collaterally produced salts are ammonium and potassium sulfates.

10. The process according to claim 1 in which the aluminum containing mineral is selected from variscite and wavelite and the collaterally produced salts are ammonium phosphates.

11. A process for preparing basic aluminum sulfates and hydrated aluminum oxides substantially free of impurities with collateral production of ammonium and potassium sulfates starting from alunite mineral, comprising dehydroxylating the mineral starting material by heating it, forming an aqueous suspension thereof, bubbling gaseous ammonia through the suspension while maintaining it at boiling temperature and forming ammonium and potassium sulfates that dissolve in the water of the suspension, and simultaneously forming hydrated aluminum oxides and aluminum hydroxide that remain in the suspension; separating the ammonium and potassium sulfates solution from the hydrated aluminum oxides containing solids that are held in aqueous suspension, bubbling $SO_2$ through said suspension thereby forming acid aluminum sulfite that dissolves in the water of the suspension, separating the acid aluminum sulfite solution from the solids still present and forming an aqueous suspension with the solids remaining; treating this suspension with sulfuric acid and forming soluble aluminum sulfate with evolution of sulfurous anhydride that is recirculated to said aqueous suspension through which the $SO_2$ is being bubbled; heating the previously separated acid aluminum sulfite solution to boiling so that the sulfite decomposes with the evolution of sulfurous anhydride that is again recirculated to the aqueous suspension through which $SO_2$ is first being bubbled, and a mixture of basic aluminum sulfites, hydroxides and hydrated aluminas precipitate; separating this precipitate from the solution, and mixing it with the previously prepared aluminum sulfate solution that is heated to boiling, whereby the basic aluminum sulfate and hydrated aluminum oxides are formed as the end products with further evolution of $SO_2$ capable of being recirculated.

* * * * *